United States Patent

Lambert

[15] 3,686,839
[45] Aug. 29, 1972

[54] COMBINATION OF A RAPIDLY REMOVABLE LAWN EDGER AND A ROTARY LAWNMOWER

[72] Inventor: Lucian T. Lambert, 6004 E. 18th, Tulsa, Okla. 74112

[22] Filed: June 11, 1971

[21] Appl. No.: 152,099

[52] U.S. Cl..................................56/11.6, 56/16.9
[51] Int. Cl........................A01d 35/26, A01d 53/14
[58] Field of Search....56/16.9, 11.6, 17.1, 256, 12.9, 56/13.7, 11.5, 17.4, 11.3

[56] References Cited

UNITED STATES PATENTS

| | | |
|---|---|---|
| 3,304,700 | 2/1967 | Barber..........................56/11.6 |
| 2,862,344 | 12/1958 | Caudle, Sr. et al.........56/16.9 |
| 3,490,213 | 1/1970 | Pinto..........................56/16.9 |
| 2,854,804 | 10/1958 | Scott..........................56/16.9 |
| 2,721,432 | 10/1955 | Machovec.................56/17.1 |

FOREIGN PATENTS OR APPLICATIONS 230,276   10/1957   Australia....................56/16.9

Primary Examiner—Russell R. Kinsey
Attorney—Head & Johnson

[57] ABSTRACT

The edger blade is mounted on a horizontal shaft in an edger assembly that is adapted to slide into and be held by a fixture on the bed of the mower. The edger is driven by a belt from the vertical shaft of the mower. Spring means urges the edger assembly outwardly to maintain belt tension, while the belt holds the assembly in the fixture.

6 Claims, 2 Drawing Figures

PATENTED AUG 29 1972　　　　3,686,839

INVENTOR.
LUCIAN T. LAMBERT
BY
Head & Johnson
ATTORNEYS

COMBINATION OF A RAPIDLY REMOVABLE LAWN EDGER AND A ROTARY LAWNMOWER

BACKGROUND OF THE INVENTION

1. Field of the Invention

This invention is in the field of lawn tending equipment such as lawnmowers and lawn edgers. More particularly it is directed to an edger that can be rapidly and simply mounted to and demounted from a rotary lawnmower so that when mounted, the motive unit, transport and control means of the mower can be used to carry and provide power to the edger, while when the edger is demounted, the edger is completely separated from the mower, yet can be rapidly remounted when needed.

2. Description of the Prior Art

It has been known to use a rotary mower and separately to use a rotary edger. However, this requires
 a. separate motive power for the two units; and
 b. separate frame, wheels and handle, etc., for the two units.

SUMMARY OF THE INVENTION

These disadvantages of the prior art are overcome in this invention by making a combination lawnmower and edger in which the edger is adapted to be rapidly mounted on and demounted from the mower. The edger assembly is mounted on a cylindrical arm. A tubular socket is hingedly mounted to the deck of the mower to swing in a vertical plane parallel to the forward-rearward axis of the mower. The arm is slidably positioned in the socket and is splined so as to keep the axis of the drive shaft of the edger horizontal, irrespective of the rotation of the socket. A belt is positioned about a pulley on the vertical shaft on the mower and a pulley on the drive shaft. Helical spring means urges the arm outwardly of the socket to provide the proper tension in the belt. Thus when the mower is to be used, the edger is rapidly and conveniently removed, permitting the mower to be used without the weight and size of the edger affecting the normal use of the mower. On the other hand when the edger is required, it can be installed rapidly and conveniently, permitting the use of the carriage and motive power of the mower for the edger.

These and other objects of this invention and a better understanding of the principles of the invention will be obtainable from the following description taken in conjunction with the appended drawings, in which:

DESCRIPTION OF THE PREFERRED EMBODIMENT

Figure 1:
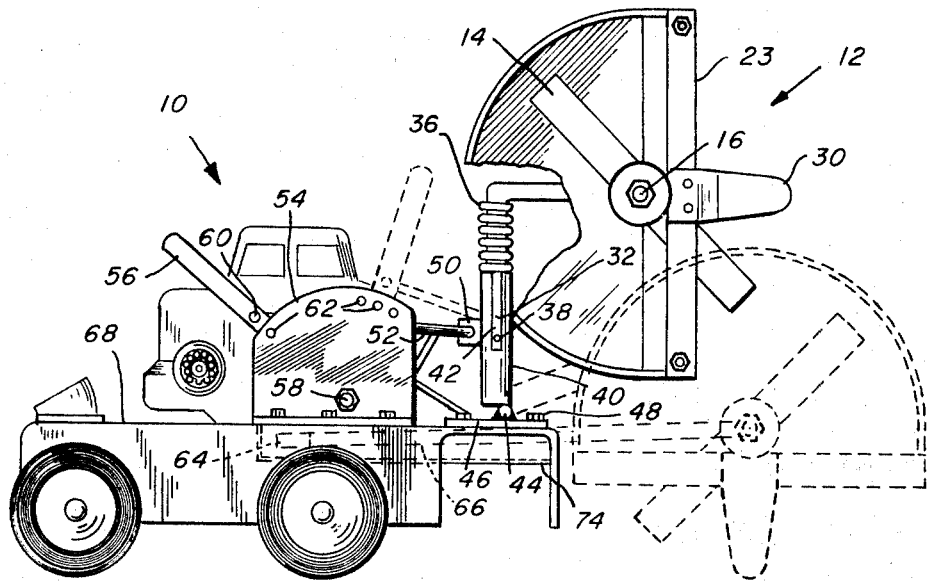
FIGS. 1 and 2 show an elevation and plan view respectively of the embodiment of this invention as applied to a rotary lawnmower.
Figure 2:
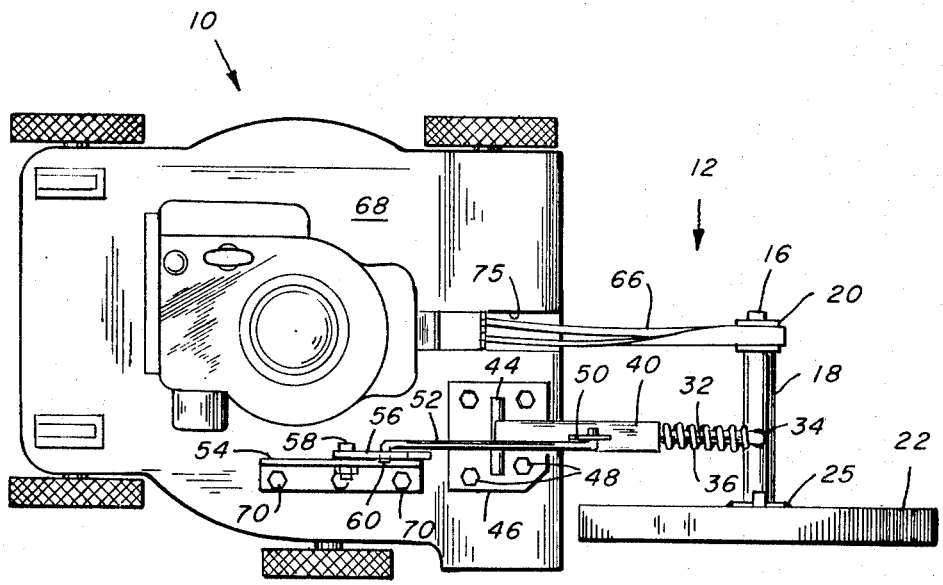

Referring now to FIGS. 1 and 2 of the drawings, the numerals 10 and 12, respectively, indicate generally the lawnmower and the lawn edger of this invention.

The edger comprises a rotary blade means 14 mounted on a shaft 16 which is journaled in a tube 18 in bearings in the ends of the tube (not shown). The tube 18 is welded at 34 to an arm 32 which is adapted to be slidably inserted in a socket means 40. There are two slots 42 in the socket means, and a pin 38 in the arm is adapted to act as a spline means to prevent axial rotation of the arm in the socket.

The socket 40 is attached by hinge means 44 to a plate 46 fastened by bolts 48 to the deck 68 of the mower. The socket is positioned so as to rotate in a vertical plane parallel to the forward-rearward axis of the mower. The tube 18 is perpendicular to the arm 32. Thus the shaft 16 remains horizontal as the socket and arm are rotated about hinge 44.

A lug 50 is welded to the socket 40, and has a hole adapted to receive a rod 52, the other end of which is received in a second hole 60 in handle 56, which is rotatable about bolt or shaft 58 in vertical plate 54 which is held by bolts 70 to deck 68. A plurality of openings 62 and a cooperating pin (not shown) on handle 56 permits the handle to be locked in any one of a variety of positions, which, with the cooperation of rod 52 provides a corresponding plurality of positions of the socket 40, and thus of the cutting blade 14 and shaft 16.

There is a first pulley 20 mounted on shaft 16, and a corresponding second pulley 64 on the drive shaft of the mower 10. This second pulley is positioned above the cutting blade of the mower. A belt 66 connects the first pulley 20 and the second pulley 64 to drive the shaft 16 and cutting blade 14. By adjusting the position of handle 56, the elevation of shaft 16 can be varied in order to make a deeper or shallower cut.

A helical spring 36 surrounds the arm 32. As the arm is inserted into the socket the spring is compressed. The belt 66 can then be slipped over the pulleys 64 and 20. Then as the spring is permitted to expand it will provide the proper tension in the belt. It will be clear that to remove the edger from the mower all that needs to be done is to press arm 32 into the socket 40, compressing the spring 35 and releasing the tension in the belt which can be slipped off pulley 20, and the arm 32 removed from socket 40. The belt is then slipped off pulley 64.

There is a shield 22 fastened by weld 25 to the tube 18, which encases the rotary edger blade 14. Also there is a guide or index member 30 fastened to support 23 which is part of the shield 22. The index 30 can be used to control the position of the cutting blade 14 with reference the edge of the lawn, curb or sidewalk, etc.

Because of the action of the main cutting bar of the mower in cutting the grass and swirling the stream of cuttings out of the mower, it is necessary to protect the pulley 64 and the belt 66 from disturbance by this flow of grass cuttings. A sheet metal housing 74 is provided to enclose the pulley 64, the belt and the belt opening 75 cut into the deck of the mower. This housing is attached to the bottom of deck 68 and slopes downward from the bottom surface of the deck in the direction of flow of air and cuttings. This serves to seal the belt space with a minimum of impediment to the flow of air. This housing also provides a convenient space to stow the belt 66 when the edger is not in use.

Although the invention has been described in terms of an arm which comprises a cylindrical rod adapted to slide in a cylindrical tube, other means of slidably, non-rotatably fastening the arm to the receiving means can, of course, be used in accordance with this invention.

While the invention has been described with some particularity, it will be clear that from the principles which have been described, one skilled in the art will be able to devise many other embodiments, all of which are considered to be part of this invention which is not to be limited to the abstract, the description or the drawings, but is to have the scope of the appended claim or claims, when construed to the full equivalents of each element.

What is claimed:

1. In a rotary lawn mower having a deck, a power means to rotate a vertical power drive shaft extending below said deck and to which is fastened a rotary cutting bar operable in a horizontal plane, the improvement comprising a removable lawn edger means, comprising:

a horizontal shaft, said shaft rotatably supported to an arm, said arm extending transverse to the axis of said horizontal shaft;

a rotary edger blade on one end of said horizontal shaft;

a first pulley means on the other end of said shaft;

a support means, one end of which is pivotally mounted, forward of said vertical power drive shaft, to said deck of said mower so as to pivot, in a vertical plane parallel to the forward-rearward axis of said mower, between an upright position to a forward position, said support, at its other end, including spline means to receive said arm for axial movement only;

spring means between said support and said arm to normally bias said arm axially outwardly from said other end;

a second pulley means attached to said vertical drive shaft between said deck and said cutting bar; and a single belt interconnecting said first and second pulleys such that when said support means is in said upright position said belt is slack, while in said forward position said belt is tensioned against said spring bias to rotate said edger blade.

2. The mower as in claim 1 including means to control and maintain a desired position of said support means in said vertical plane, whereby the elevation of said shaft above said deck of said mower is varied.

3. The mower as in claim 1 including guard means surrounding said rotary blade means supported by said arm.

4. The mower as in claim 3 including a guide means fastened to said guard means.

5. The mower as in claim 1 including housing means under the deck of said mower at least partially enclosing said second pulley means and said belt.

6. The mower as in claim 1 including an opening the deck of said mower for passage of said belt between said first and second pulleys.

* * * * *